United States Patent
Kim et al.

(10) Patent No.: US 9,335,843 B2
(45) Date of Patent: May 10, 2016

(54) DISPLAY DEVICE HAVING TOUCH SENSORS AND TOUCH DATA PROCESSING METHOD THEREOF

(71) Applicant: LG DISPLAY CO., LTD., Seoul (KR)

(72) Inventors: Sunyoung Kim, Paju-si (KR); Jonghee Hwang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 151 days.

(21) Appl. No.: 13/691,318

(22) Filed: Nov. 30, 2012

(65) Prior Publication Data

US 2013/0147735 A1    Jun. 13, 2013

(30) Foreign Application Priority Data

Dec. 9, 2011   (KR) .................. 10-2011-0132021

(51) Int. Cl.
  *G06F 3/041*  (2006.01)
  *G06F 3/044*  (2006.01)

(52) U.S. Cl.
  CPC ............... *G06F 3/041* (2013.01); *G06F 3/044* (2013.01); *G06F 3/0416* (2013.01); *G06F 2203/04104* (2013.01); *G06F 2203/04112* (2013.01)

(58) Field of Classification Search
  CPC ......... G06F 3/041; G06F 3/01; G06F 3/0488; G06F 3/0418; G06F 3/03; G06F 3/044; G06F 2203/04112; G06F 2203/04104
  USPC ..................... 345/173–175; 178/18.01–18.06
  See application file for complete search history.

(56) References Cited

U.S. PATENT DOCUMENTS

| | | | |
|---|---|---|---|
| 8,674,962 B2* | 3/2014 | Chiang et al. ................. | 345/174 |
| 2010/0079397 A1* | 4/2010 | Yang et al. ..................... | 345/173 |
| 2010/0097329 A1* | 4/2010 | Simmons et al. .............. | 345/173 |
| 2010/0252336 A1* | 10/2010 | Lu ........................... | G06F 3/044 178/18.06 |
| 2010/0289754 A1* | 11/2010 | Sleeman et al. ............... | 345/173 |
| 2010/0315372 A1* | 12/2010 | Ng ................................. | 345/174 |
| 2011/0037727 A1* | 2/2011 | Lee et al. ....................... | 345/174 |
| 2011/0087455 A1* | 4/2011 | Chang et al. .................. | 702/150 |
| 2011/0216038 A1* | 9/2011 | Stolov et al. .................. | 345/174 |
| 2012/0262419 A1* | 10/2012 | Hershman et al. ............. | 345/174 |

FOREIGN PATENT DOCUMENTS

| KR | 10-2011-0020742 A | 3/2011 |
|---|---|---|
| KR | 10-2011-0100872 A | 9/2011 |

* cited by examiner

*Primary Examiner* — Alexander Eisen
*Assistant Examiner* — Abhishek Sarma
(74) *Attorney, Agent, or Firm* — Birch, Stewart, Kolasch & Birch, LLP (57) ABSTRACT

A display device having touch sensors includes a touch screen forming sensor nodes at crossings of Tx lines and Rx lines, a Tx driving circuit supplying a touch driving pulse to the Tx lines, an Rx driving circuit which receives voltages of the sensor nodes through the Rx lines, samples the sensor node voltages, and converts the sampled sensor node voltages into touch raw data through analog-to-digital conversion, and a touch controller which receives and binarizes the touch raw data, extracts a touch area based on the binarized touch raw data, differently sets a size of a computation block based on a position of the touch area and the number of touch areas, and performs a touch computation only on touch raw data of the computation block.

10 Claims, 13 Drawing Sheets

(RELATED ART)

FIG. 2B

(RELATED ART)

DISPLAY DEVICE HAVING TOUCH SENSORS AND TOUCH DATA PROCESSING METHOD THEREOF

This application claims the priority benefit of Korean Patent Application No. 10-2011-0132021 filed on Dec. 9, 2011, which is incorporated herein by reference for all purposes as if fully set forth herein.

BACKGROUND OF THE INVENTION

1. Field of the Invention

Embodiments of the invention relate to a display device having touch sensors and a touch data processing method thereof.

2. Discussion of the Related Art

A touch screen has replaced button switches as a user input device due to the trend of light weight and thin profile of household appliances and electronic devices. The touch screen is a device configured so that a user directly touches the screen without the use of other input devices to input information. The touch screen starts to be used in the cellular phone market and has been widely used in most of IT products.

The touch screen used in a display device includes a plurality of touch sensors. The touch sensors may be embedded in the display panel in an in-cell type. Alternatively, the touch sensors may be coupled with the display panel in an on-cell type or add-on cell type. The touch sensors may be implemented as resistive type touch sensors, capacitive type touch sensors, electromagnetic type touch sensors, etc. The capacitive type touch sensor, which senses a position having changes in a capacitance and senses a touched portion, has been widely used.

Figure 1A:
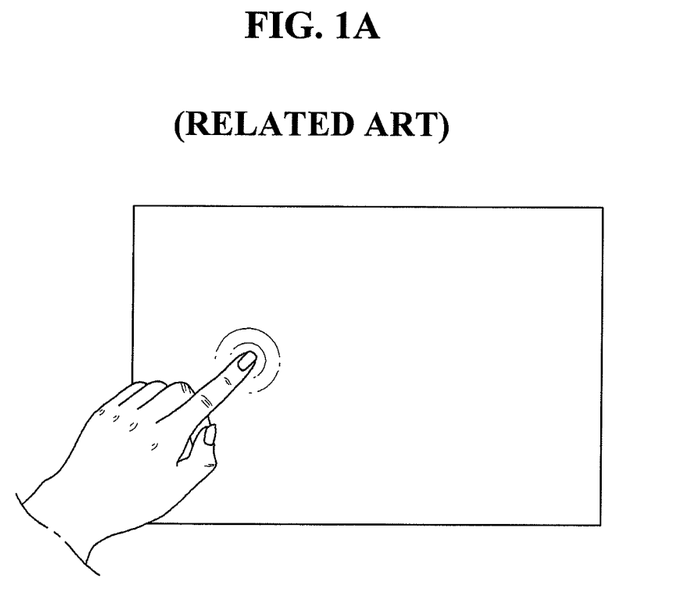
FIG. 1A illustrates an example of single touch.
Figure 1B:
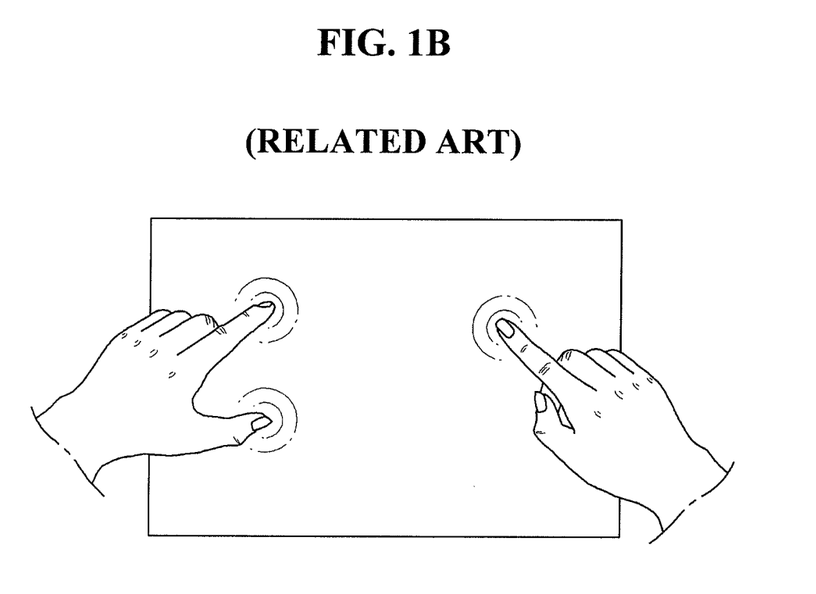
FIG. 1B illustrates an example of multi-touch.

There are single touch and multi-touch as a touch method. As shown in FIG. 1A, the single touch is a method which touches only one portion on the touch screen with a user' finger and recognizes only the one touched portion of the touch screen. The single touch was used in restaurants, automatic teller machines, explanation of product displayed at the museum, educational institutions, airport kiosks, etc. The multi-touch shown in FIG. 1B occupied a small fraction of the entire touch market so far. However, in recent, a function capable of enlarging and reducing a display image using user's two fingers is preferably used in iPhone, and thus the multi-touch has been gradually spotlighted.

Figure 2A:
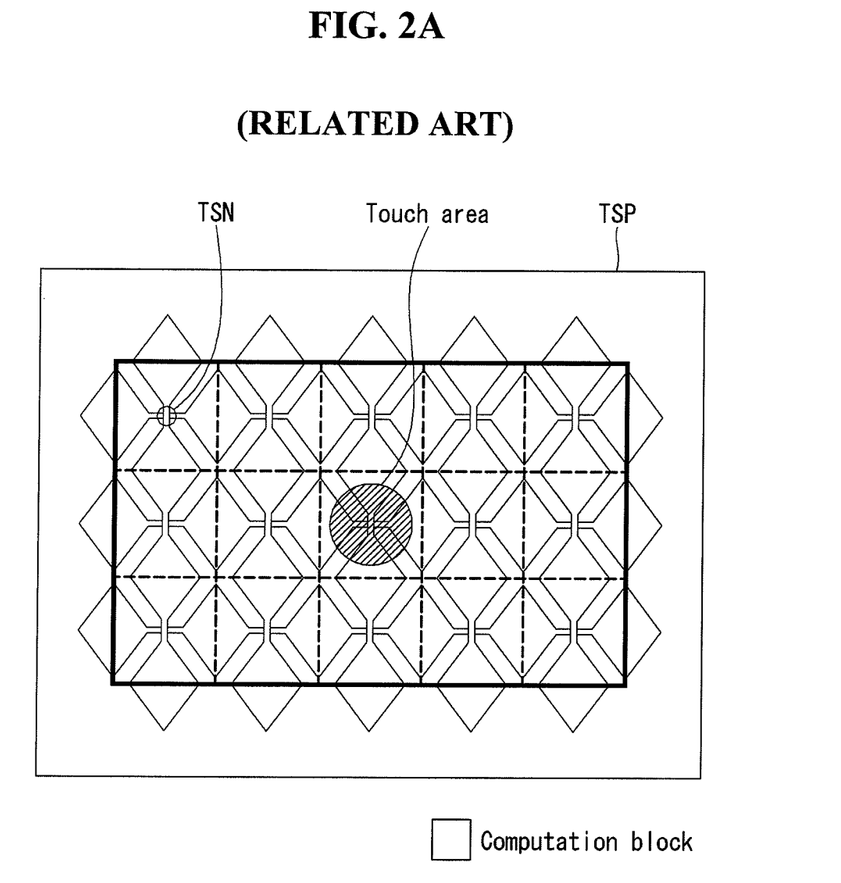
FIGS. 2A and 2B illustrate examples of setting the entire area of a touch profile corresponding to all of sensor nodes to a computation block irrespective of a touched position, the number of touched positions, etc.
Figure 2B:
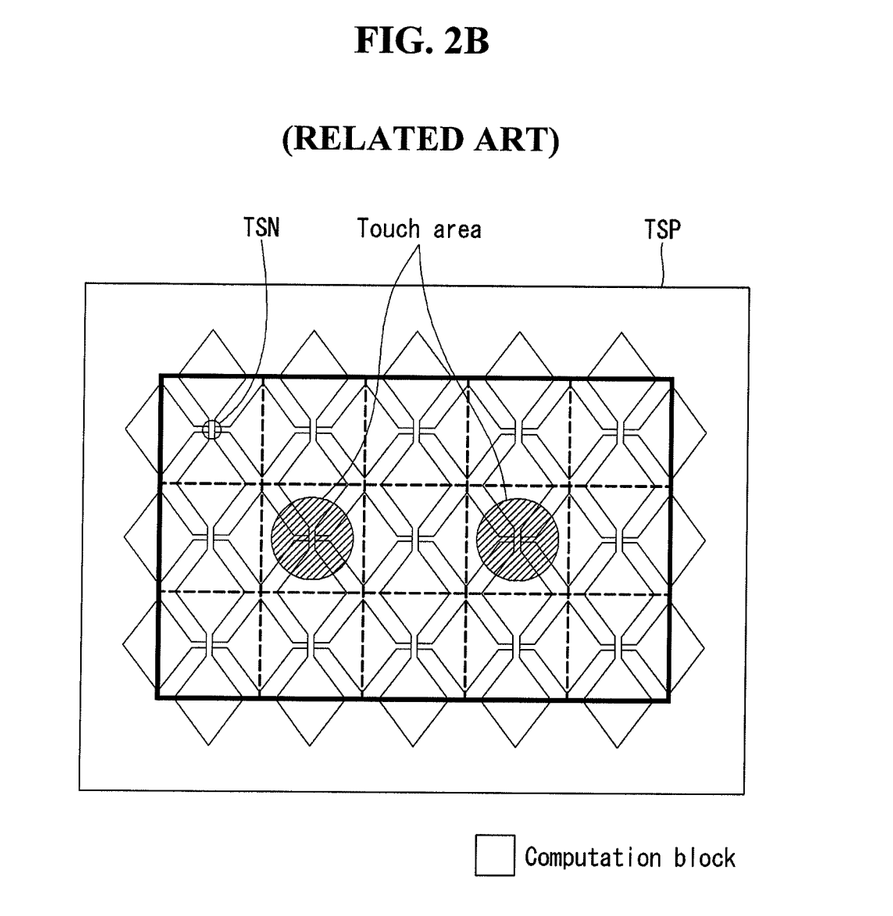

As shown in FIGS. 2A and 2B, capacitive type touch sensors included in a touch screen TSP include a plurality of sensor nodes TSN. The sensor nodes TSN are formed at crossings of a plurality of Tx lines and a plurality of Rx lines and configure mutual capacitors. Each of the capacitive type touch sensors calculates changes in capacitance charged to the mutual capacitor before and after a touch operation and recognizes a touched position.

The related art capacitive type touch sensors obtained touch raw data corresponding to the number of touch sensors to obtain a touch profile and decided whether or not a touch operation is performed based on all of the touch raw data of the touch profile. If the touch operation was performed, a touch coordinate was calculated. As shown in FIGS. 2A and 2B, the related art capacitive type touch sensors performed a touch computation on all of the touch raw data obtained through the sensing operation irrespective of a position of a touch area, the number of touch areas, etc. to decide whether or not the touch operation is performed and calculated the touch coordinate. Therefore, it was difficult to increase a touch computation speed because of a large amount of data to be computed. As shown in FIGS. 2A and 2B, the related art capacitive type touch sensors set the entire area of the touch profile corresponding to all of the sensor nodes TSN to a computation block irrespective of the position of the touch area, the number of touch areas, etc.

SUMMARY OF THE INVENTION

Embodiments of the invention provide a display device having touch sensors and a touch data processing method thereof capable of increasing a touch computation speed.

In one aspect, there is a display device having touch sensors comprising a touch screen configured to form a plurality of sensor nodes at crossings of a plurality of Tx lines and a plurality of Rx lines, a display panel having the touch screen, a Tx driving circuit configured to supply a touch driving pulse to the plurality of Tx lines, an Rx driving circuit configured to receive voltages of the sensor nodes through the plurality of Rx lines, sample the received sensor node voltages, and convert the sampled sensor node voltages into touch raw data through analog-to-digital conversion, and a touch controller configured to receive and binarize the touch raw data, extract a touch area based on the binarized touch raw data, differently set a size of a computation block based on a position of the extracted touch area and the number of extracted touch areas, perform a touch computation only on touch raw data of the computation block, give a touch label to the touch area, and calculate a touch coordinate value.

In another aspect, there is a touch data processing method of a display device having touch sensors including a touch screen forming a plurality of sensor nodes at crossings of a plurality of Tx lines and a plurality of Rx lines, a display panel having the touch screen, a Tx driving circuit supplying a touch driving pulse to the plurality of Tx lines, and an Rx driving circuit which receives voltages of the sensor nodes through the plurality of Rx lines, samples the received sensor node voltages, and converts the sampled sensor node voltages into touch raw data through analog-to-digital conversion, the touch data processing method comprising receiving and binarizing the touch raw data and extracting a touch area based on the binarized touch raw data, differently setting a size of a computation block based on a position of the extracted touch area and the number of extracted touch areas, and performing a touch computation only on touch raw data of the computation block to give a touch label to the touch area and to calculate a touch coordinate value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Example embodiments of the invention will be described with reference to FIGS. 3 to 11.

Figure 3:
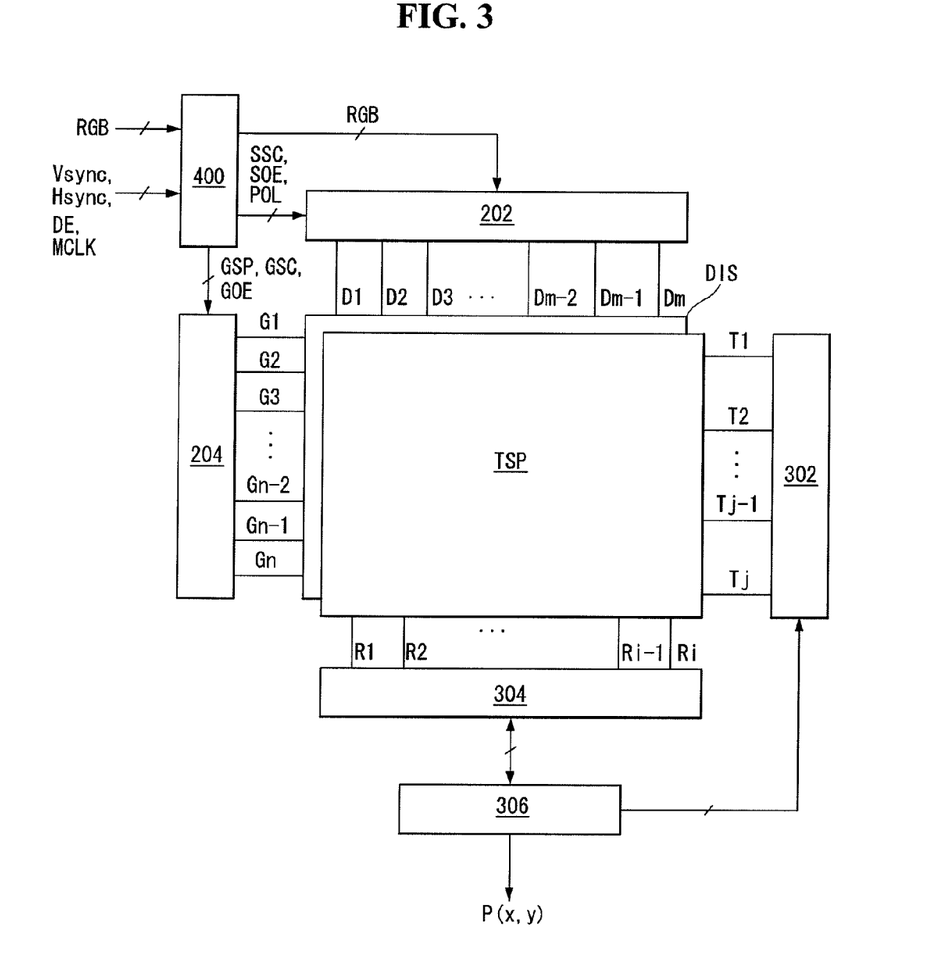
FIG. 3 is a block diagram of a display device having touch sensors according to an example embodiment of the invention.
Figure 4:
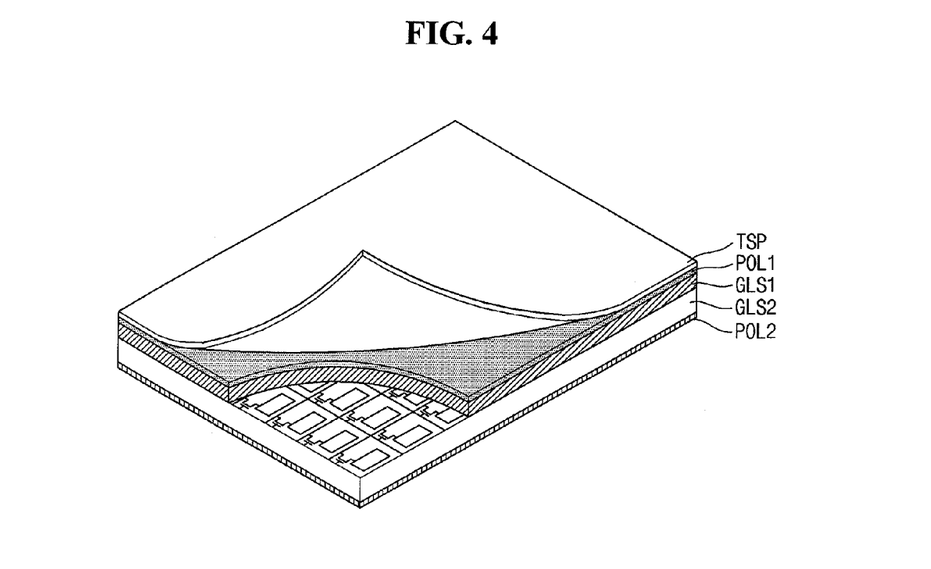
FIGS. 4 to 6 illustrate various combinations of a touch screen and a display panel according to an example embodiment of the invention.
Figure 5:
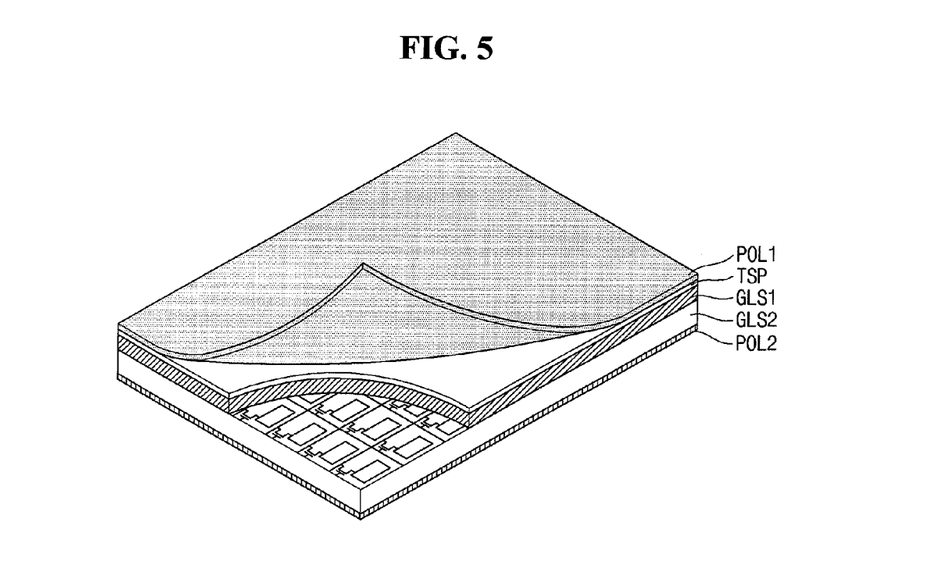
Figure 6:
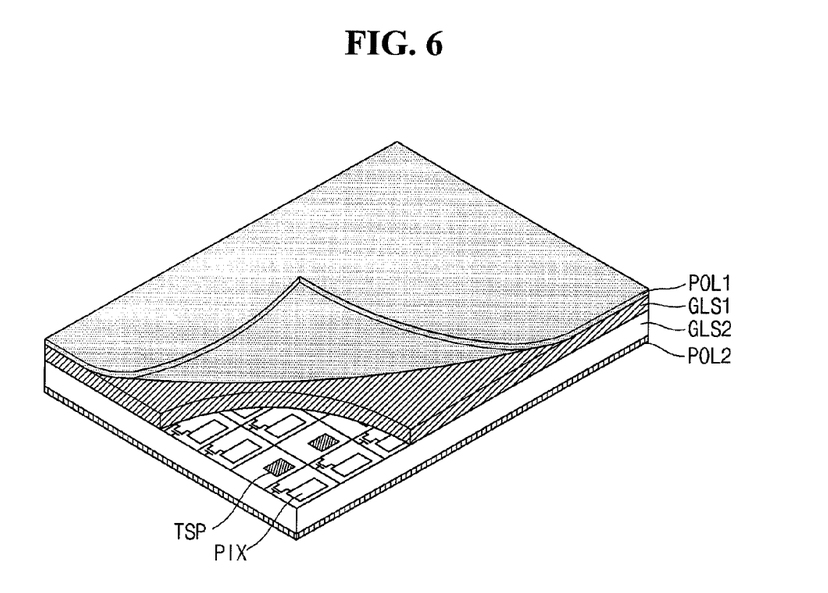

FIG. 3 is a block diagram of a display device having touch sensors according to an example embodiment of the invention. FIGS. 4 to 6 illustrate various combinations of a touch screen and a display panel.

As shown in FIG. 3, a display device according to an example embodiment of the invention includes a display panel DIS, a display driving circuit, a timing controller 400, a touch screen TSP, a touch screen driving circuit, a touch controller 306, etc. All components of the display device are operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower glass substrate GLS2, an upper glass substrate GLS1, and a liquid crystal layer formed between the lower glass substrate GLS2 and the upper glass substrate GLS1. The lower glass substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper glass substrate GLS1 of the display panel DIS may include black matrixes, color filters, etc. The lower glass substrate GLS2 of the display panel DIS may be configured in a COT (color filter on TFT) structure. In this instance, the black matrixes and the color filters may be formed on the lower glass substrate GLS2 of the display panel DIS.

Polarizing plates POL1 and POL2 are respectively attached to the upper and lower glass substrates GLS1 and GLS2 of the display panel DIS. Alignment layers for setting a pre-tilt angle of liquid crystals are respectively formed on the inner surfaces contacting the liquid crystals in the upper and lower glass substrates GLS1 and GLS2 of the display panel DIS. A column spacer may be formed between the upper and lower glass substrates GLS1 and GLS2 of the display panel DIS to keep cell gaps of the liquid crystal cells constant.

A backlight unit may be disposed on a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 202 and a scan driving circuit 204. The display driving circuit applies a video data voltage of an input image to the pixels of the display panel DIS. The data driving circuit 202 converts digital video data RGB received from the timing controller 400 into positive and negative analog gamma compensation voltages and outputs the data voltage. The data driving circuit 202 then supplies the data voltage to the data lines D1 to Dm. The scan driving circuit 204 sequentially supplies the gate pulse synchronized with the data voltage to the gate lines G1 to Gn and selects pixel lines of the display panel DIS to which the data voltage will be applied.

The timing controller 400 receives timing signals, such as a vertical sync signal Vsync, a horizontal sync signal Hsync, a data enable DE, and a main clock MCLK, from an external host system. The timing controller 400 generates a data timing control signal and a scan timing control signal for respectively controlling operation timings of the data driving circuit 202 and the scan driving circuit 204 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

As shown in FIG. 4, the touch screen TSP may be attached on the upper polarizing plate POL1 of the display panel DIS. Alternatively, as shown in FIG. 5, the touch screen TSP may be formed between the upper polarizing plate POL1 and the upper glass substrate GLS1. Alternatively, as shown in FIG. 6, the touch screen TSP may be formed on the lower glass substrate GLS2 along with a pixel array of the display panel DIS in an in-cell manner. In FIGS. 4 to 6, 'PIX' denotes the pixel electrode of the liquid crystal cell.

The touch screen TSP includes Tx lines T1 to Tj, where j is a positive integer less than n, Rx lines R1 to Ri crossing the Tx lines T1 to Tj, where i is a positive integer less than m, and i×j sensor nodes formed at crossings of the Tx lines T1 to Tj and the Rx lines R1 to Ri.

The touch screen driving circuit includes a Tx driving circuit 302 and an Rx driving circuit 304. The touch screen driving circuit supplies a touch driving pulse to the Tx lines T1 to Tj and senses voltages (or sensor node voltages) of the sensor nodes through the Rx lines R1 to Ri to convert the sensed sensor node voltages into digital data. The Tx driving circuit 302 and the Rx driving circuit 304 may be integrated in one readout integrated circuit (ROIC) 40.

The Tx driving circuit 302 sets a Tx channel, which will output the touch driving pulse, in response to a Tx setup signal received from the touch controller 306. The Tx driving circuit 302 supplies the touch driving pulse to the Tx lines T1 to Tj connected to the Tx channel, which is set in response to the Tx setup signal in each sensing time.

The Rx driving circuit 304 sets the Rx channel, which will receive the voltage of the sensor node, in response to an Rx setup signal received from the touch controller 306. The Rx driving circuit 304 receives the sensor node voltage through the Rx lines R1 to Ri connected to the Rx channel, which is set in response to the Rx setup signal, and samples the sensor node voltage. The Rx driving circuit 304 converts the sampled sensor node voltage into digital data, i.e., touch raw data for an analog-to-digital conversion time and transmits the touch raw data to the touch controller 306.

The touch controller 306 is connected to the Tx driving circuit 302 and the Rx driving circuit 304 through an interface such as I²C bus, a serial peripheral interface (SPI), and a system bus. The touch controller 306 respectively supplies the Tx and Rx setup signals to the Tx driving circuit 302 and the Rx driving circuit 304. Hence, the touch controller 306 sets the Tx channel to output the touch driving pulse and sets the Rx channel to receive the sensor node voltage. The touch controller 306 supplies a switch control signal for controlling a sampling timing of a sampling circuit embedded in the Rx driving circuit 304 to the Rx driving circuit 304 to control a sampling timing of the sensor node voltage. Further, the touch controller 306 supplies an analog-to-digital conversion clock to an analog-to-digital converter (ADC) embedded in the Rx driving circuit 304 to control analog-to-digital conversion timing of the sensor node voltage.

The touch controller 306 receives the touch raw data from the Rx driving circuit 304 and binarizes the touch raw data. The touch controller 306 extracts a touch area based on the binarized touch raw data and sets a computation block consisting of four sides (or four boundaries) surrounding the touch area at the shortest distance, so as to increase a touch computation speed. The touch controller 306 performs a touch computation only on the touch raw data of the computation block, thereby giving a touch label (or a touch ID) to the touch area and calculating a touch coordinate value of the touch area. The touch controller 306 corrects the calculated touch coordinate value in conformity with a resolution of the display panel DIS and transmits a corrected touch coordinate value P(x, y) as digital touch data of HID format to the external host system. The host system runs an application related to the touch coordinate value P(x, y) of the touch raw data received from the touch controller 306.

Figure 7:
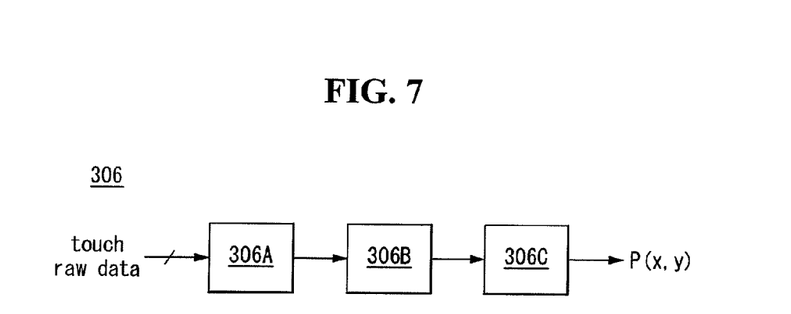
FIG. 7 schematically illustrates configuration of a touch controller.
Figure 8:
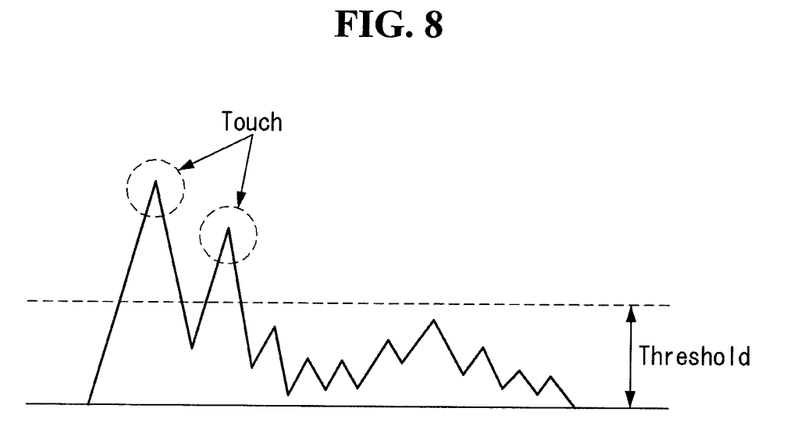
FIG. 8 illustrates a method for binarizing touch raw data.
Figure 9:
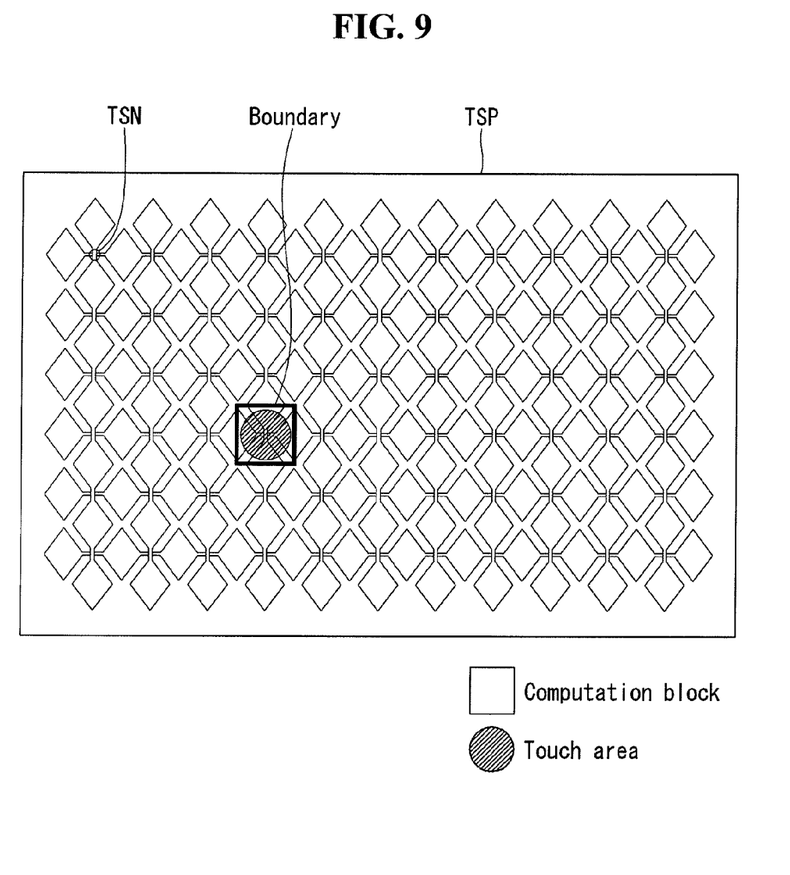
FIG. 9 illustrates an example of setting a computation block in a single touch operation.

FIG. 7 schematically illustrates configuration of the touch controller 306. FIG. 8 illustrates a method for binarizing touch raw data based on a previously determined threshold value. FIG. 9 illustrates an example of setting a computation block in a single touch operation. FIGS. 10A to 10D illustrate various examples of setting a computation block in a multi-touch operation.

As shown in FIG. 7, the touch controller 306 includes a touch sensing unit 306A, a touch lock-on unit 306B, and a resolution correction unit 306C.

The touch sensing unit 306A receives all of the touch raw data of the touch screen TSP from the Rx driving circuit 304. As shown in FIG. 8, the touch sensing unit 306A binarizes the touch raw data based on a previously determined threshold value. The touch sensing unit 306A sets touch raw data greater than the threshold value to '1' and sets touch raw data equal to or less than the threshold value to '0', thereby binarizing all of the touch raw data of the touch screen TSP. The touch sensing unit 306A extracts an area having a data value of '1' as the touch area. The number of touch areas may be one as shown in FIG. 9, and may be at least two as shown in FIGS. 10A to 10D.

Figure 10A:
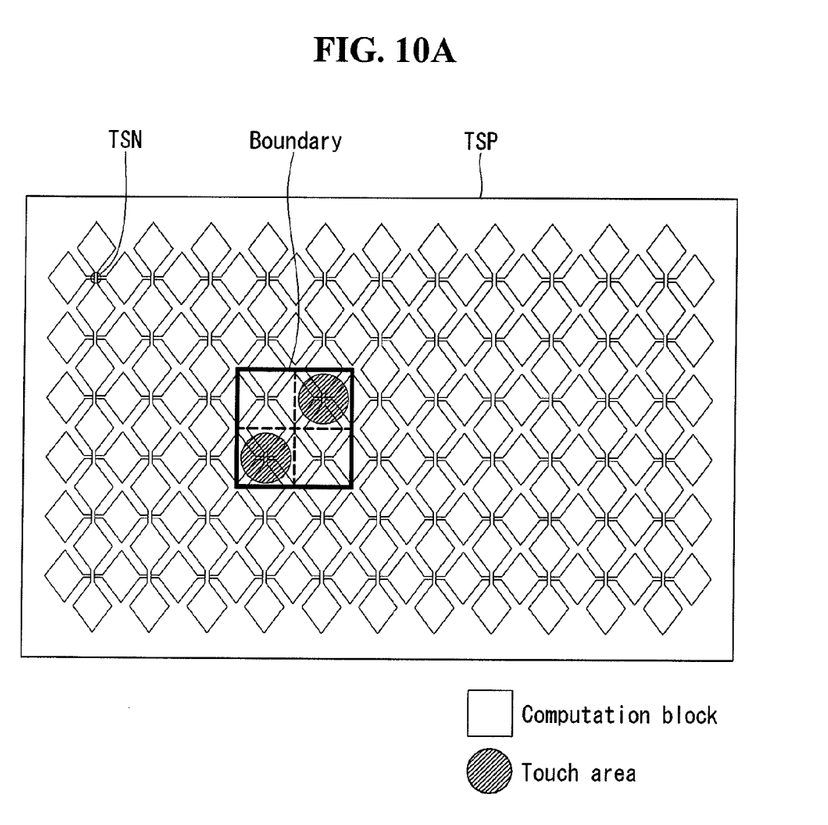
FIGS. 10A to 10D illustrate various examples of setting a computation block in a multi-touch operation.
Figure 10B:
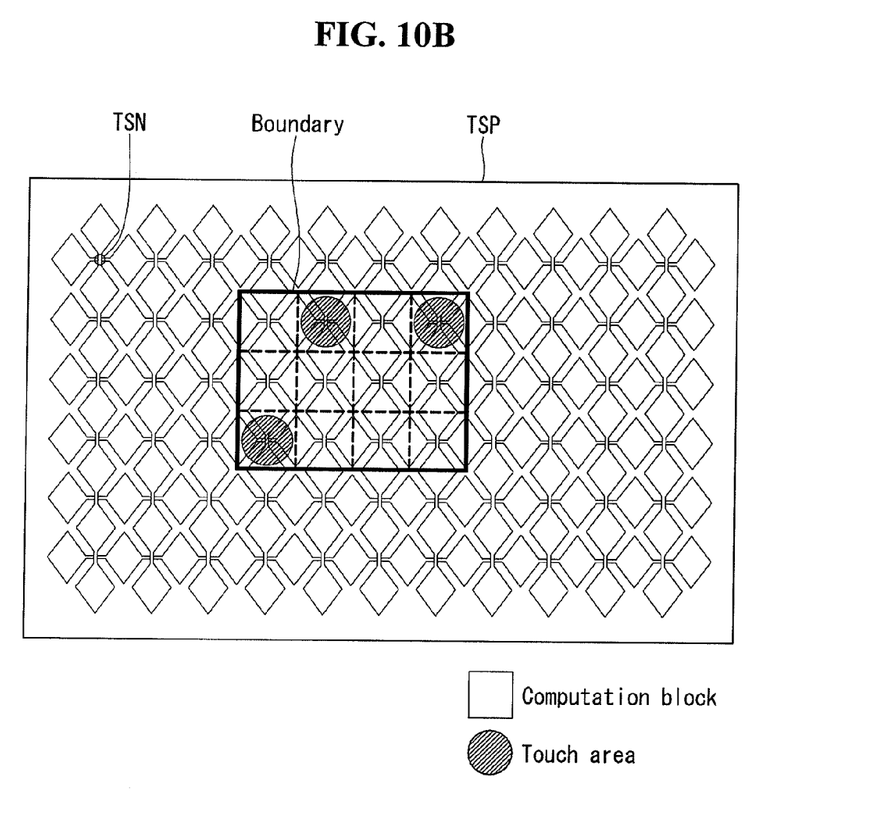
Figure 10C:
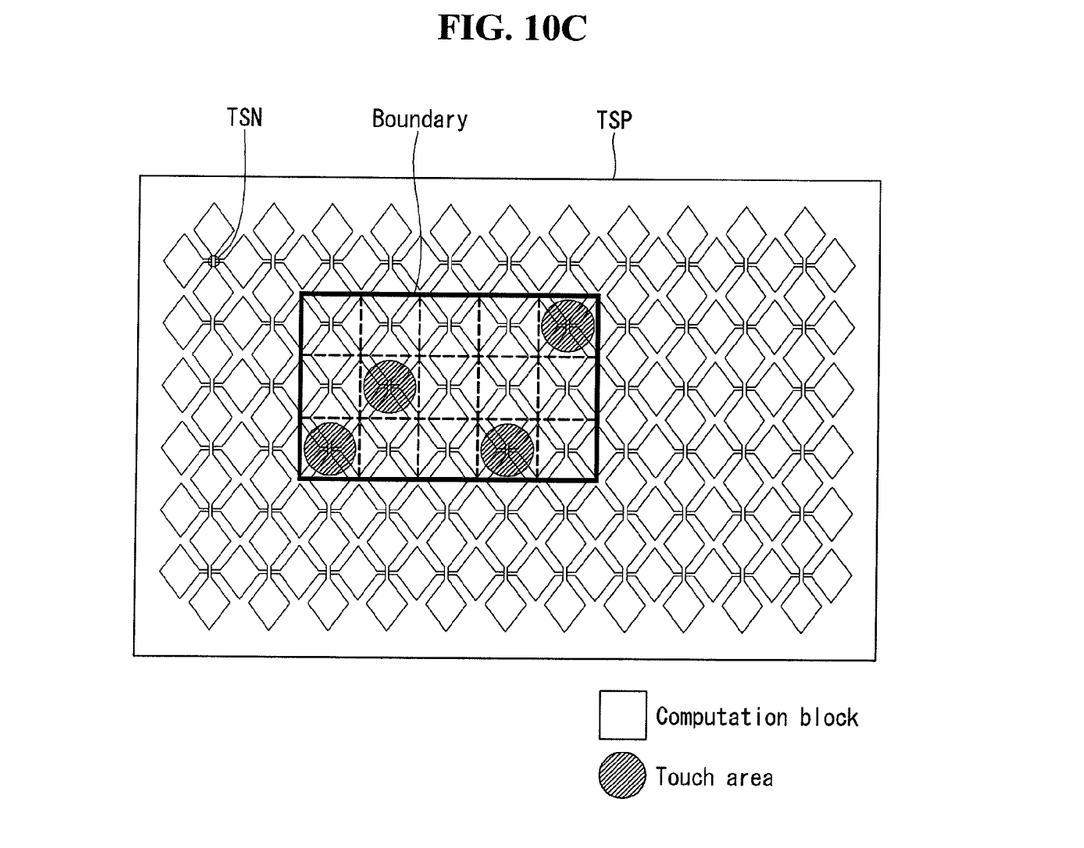
Figure 10D:
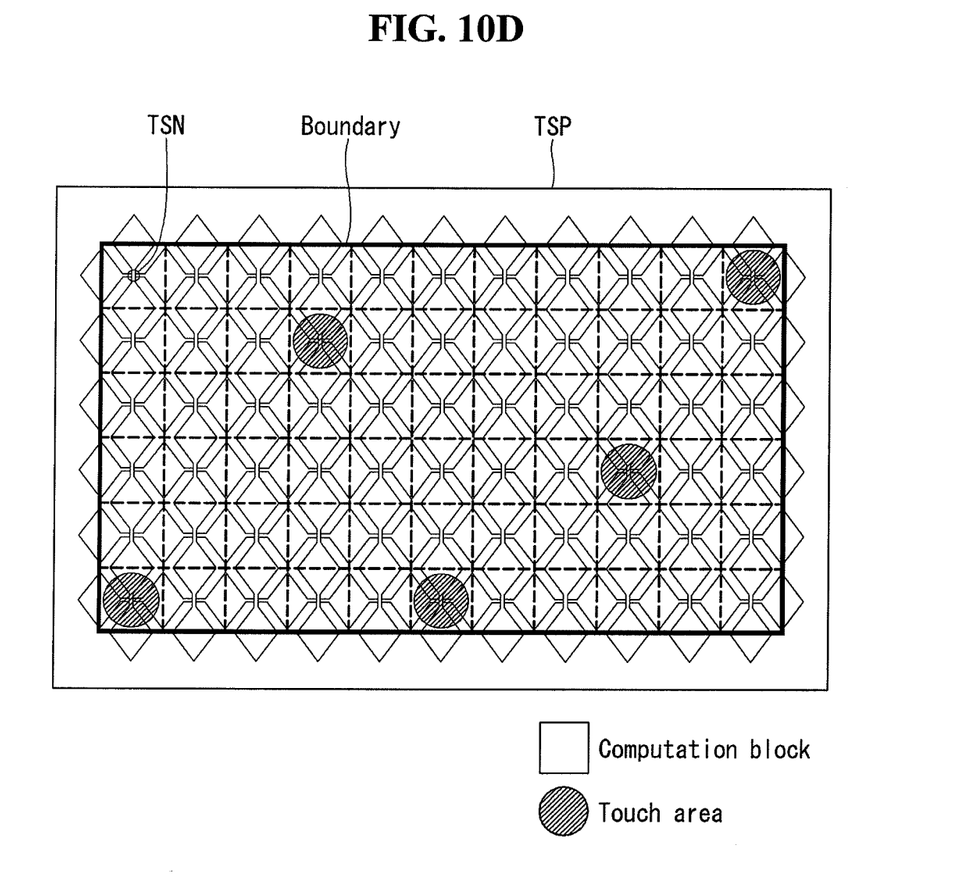

The touch sensing unit 306A differently sets the size of the computation block based on a position and the number of the touch area(s), so as to increase the touch computation speed. For this, the touch sensing unit 306A sets the computation block consisting of four sides (or four boundaries) surrounding the touch area(s) at the shortest distance. For example, as shown in FIG. 9, the touch sensing unit 306A sets a computation block consisting of four sides (or four boundaries) surrounding a single touch area at the shortest distance. As shown in FIGS. 10A to 10D, the touch sensing unit 306A sets a computation block consisting of four sides (or four boundaries) surrounding multi-touch areas at the shortest distance. FIG. 10A illustrates two touch areas surrounded by the computation block, FIG. 10B illustrates three touch areas surrounded by the computation block, FIG. 10C illustrates four touch areas surrounded by the computation block, and FIG. 10D illustrates five touch areas surrounded by the computation block. In FIGS. 10A to 10D, the size of the computation block is determined using outermost touch areas among the multi-touch areas as vertexes.

In the related art, the touch computation is performed on all of the touch raw data of the touch screen. On the other hand, the touch sensing unit 306A performs the touch computation only on the touch raw data of the computation block to thereby give the touch label (or the touch ID) to the touch area. In the embodiment of the invention, because the touch computation is performed only on the touch raw data of the computation block, an amount of data to be computed decreases as the size of the computation block decreases. As a result, the touch computation speed is improved.

When the touch operation is performed and then a touched position moves, the touch lock-on unit 306B recognizes successive touched positions along a movement path as not individual touch areas but one touch area. Hence, the accuracy of the touched position is improved.

The resolution correction unit 306C performs a touch coordinate extraction algorithm only on the touch raw data of the computation block to calculate the touch coordinate value. In the embodiment of the invention, because only the touch raw data of the computation block is computed through the touch coordinate extraction algorithm, an amount of data to be computed decreases. As a result, the touch computation speed is improved.

Because a physical resolution of the touch screen TSP is less than a physical resolution of the display panel DIS, the resolution correction unit 306C corrects the calculated touch coordinate value in conformity with the physical resolution of the display panel DIS. The resolution correction unit 306C calculates sensor data of a left sensor node and sensor data of a right sensor node positioned on both sides of a center node, which is closest to a center point of the touch area and has peak data, in an X-axis direction, and a first offset value, which is set based on the peak data in the X-axis direction. The resolution correction unit 306C adds the first offset value to an x-coordinate of the center node and multiplies an addition result by a first resolution ratio obtained by dividing a horizontal resolution of the display panel DIS by a horizontal resolution of the touch screen TSP, thereby compensating for an x-coordinate of the touch area. Further, the resolution correction unit 306C calculates sensor data of an upper sensor node and sensor data of a lower sensor node positioned on both sides of the center node in a Y-axis direction, and a second offset value, which is set based on the peak data in the Y-axis direction. The resolution correction unit 306C adds the second offset value to a y-coordinate of the center node and multiplies an addition result by a second resolution ratio obtained by dividing a vertical resolution of the display panel DIS by a vertical resolution of the touch screen TSP, thereby compensating for a y-coordinate of the touch area. The resolution correction unit 306C outputs the compensated x- and y-coordinates of the touch area as the corrected touch coordinate value P(x, y).

Figure 11:
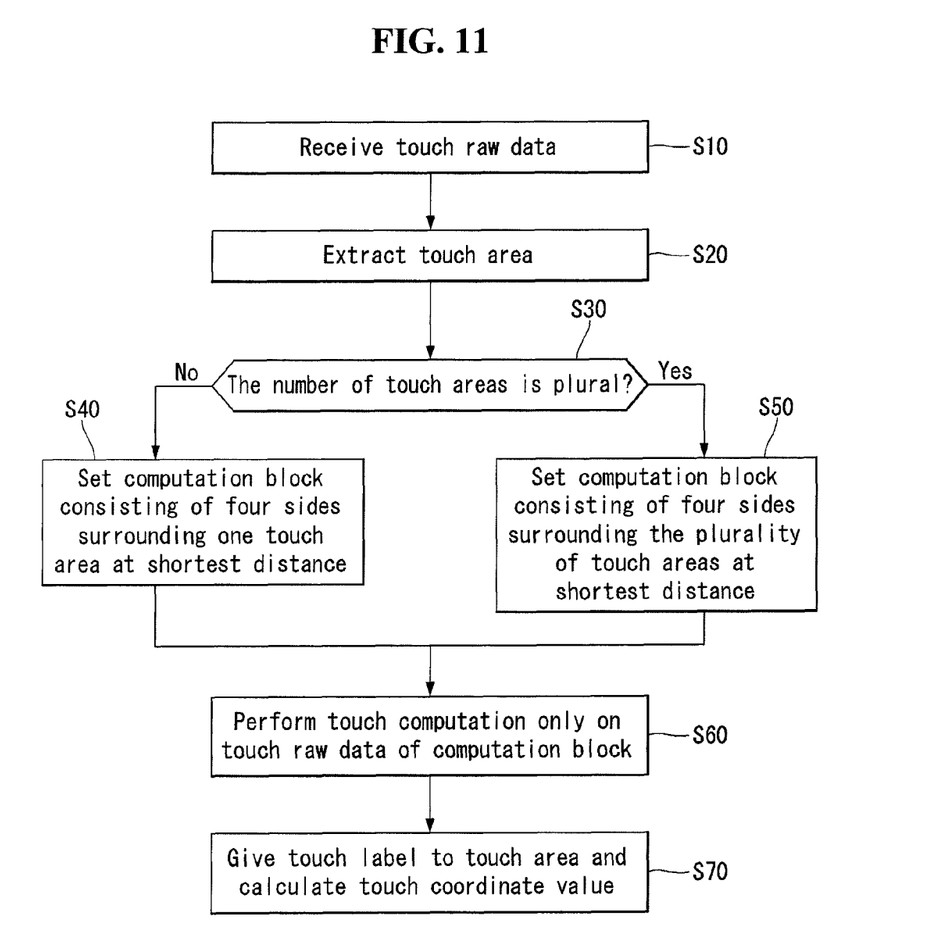
FIG. 11 illustrates a touch data processing method of a display device having touch sensors according to an example embodiment of the invention.

FIG. 11 illustrates a touch data processing method of the display device having touch sensors according to the embodiment of the invention.

As shown in FIG. 11, the touch data processing method of the display device according to the embodiment of the invention receives all of touch raw data of the touch screen from the Rx driving circuit in step S10.

The touch data processing method of the display device according to the embodiment of the invention binarizes touch raw data based on a previously determined threshold value and extracts a touch area based on the binarized touch raw data in step S20.

The touch data processing method of the display device according to the embodiment of the invention differently sets the size of a computation block based on a position of the touch area and the number of touch areas, so as to increase the touch computation speed. For this, the touch data processing method decides whether the number of touch areas is one or plural in step S30. When one touch area is formed, the touch data processing method sets a computation block consisting of four sides (or four boundaries) surrounding one touch area at the shortest distance in step S40. When the number of touch areas is plural, the touch data processing method sets a computation block consisting of four sides (or four boundaries) surrounding the plurality of touch areas at the shortest distance in step S50.

The touch data processing method of the display device according to the embodiment of the invention performs the touch computation only on the touch raw data of the computation block in step S60. The touch data processing method gives a touch label (or a touch ID) to the touch area and performs a touch coordinate extraction algorithm only on the touch raw data of the computation block to calculate a touch coordinate value in step S70.

As described above, the display device having touch sensors and the touch data processing method thereof according to the embodiment of the invention thereof differently set the size of the computation block based on the position of the touch area and the number of touch areas and perform the touch computation only on the touch raw data of the computation block. Hence, the display device having touch sensors and the touch data processing method thereof according to the embodiment of the invention may greatly reduce an amount of data to be computed as compared with the related art and thus may greatly increase the touch computation speed.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device having touch sensors, the display device comprising:
    a touch screen configured to form a plurality of sensor nodes at crossings of a plurality of Tx lines and a plurality of Rx lines;
    a display panel having the touch screen;
    a Tx driving circuit configured to supply a touch driving pulse to the plurality of Tx lines;
    an Rx driving circuit configured to receive voltages of the sensor nodes through the plurality of Rx lines, sample the received sensor node voltages, and convert the sampled sensor node voltages into touch raw data through analog-to-digital conversion; and
    a touch controller configured to:
        receive and binarize the touch raw data by comparing each touch raw data with a threshold value,
        extract a touch area based on the binarized touch raw data,
        differently set a size of a computation block based on a position of the extracted touch area and the number of extracted touch areas, the computation block consisting of four sides or four boundaries surrounding the touch area at a shortest distance to form a rectangle,
        perform a touch computation only on touch raw data of the computation block,
        give a touch label to the touch area, and
        calculate a touch coordinate value,
    wherein:
    the four boundaries of the computation block surround both multi-touch areas and a non-touch area at a shortest distance if the number of extracted touch areas is more than one,
    when the number of extracted touch areas is one, the touch controller sets the computation block consisting of four sides or four boundaries surrounding the one touch area at the shortest distance, and
    when the number of extracted touch areas is plural, the touch controller sets the computation block consisting of four sides or four boundaries surrounding the plurality of touch areas at the shortest distance.

2. The display device having touch sensors of claim 1, wherein the size of the computation block is determined using outermost touch areas among the plurality of touch areas as vertexes.

3. A touch data processing method of a display device having touch sensors including a touch screen forming a plurality of sensor nodes at crossings of a plurality of Tx lines and a plurality of Rx lines, a display panel having the touch screen, a Tx driving circuit supplying a touch driving pulse to the plurality of Tx lines, and an Rx driving circuit which receives voltages of the sensor nodes through the plurality of Rx lines, samples the received sensor node voltages, and converts the sampled sensor node voltages into touch raw data through analog-to-digital conversion, the touch data processing method comprising:
    receiving and binarizing the touch raw data by comparing each touch raw data with a threshold value and extracting a touch area based on the binarized touch raw data;
    differently setting a size of a computation block based on a position of the extracted touch area and the number of extracted touch areas, the computation block consisting of four sides or four boundaries surrounding the touch area at a shortest distance to form a rectangle; and performing a touch computation only on touch raw data of the computation block to give a touch label to the touch area and to calculate a touch coordinate value, wherein:

the four boundaries of the computation block surround both multi-touch areas and a non-touch area at a shortest distance if the number of extracted touch areas is more than one, the differently setting of the size of the computation block includes, when the number of extracted touch areas is one, setting the computation block consisting of four sides or four boundaries surrounding the one touch area at the shortest distance, and the differently setting of the size of the computation block includes, when the number of extracted touch areas is plural, setting the computation block consisting of four sides or four boundaries surrounding the plurality of touch areas at the shortest distance.

4. The touch data processing method of claim 3, wherein the size of the computation block is determined using outermost touch areas among the plurality of touch areas as vertexes.

5. A display device having touch sensors, the display device comprising:

a touch screen configured to form a plurality of sensor nodes at crossings of a plurality of Tx lines and a plurality of Rx lines;

a display panel having the touch screen;

a Tx driving circuit configured to supply a touch driving pulse to the plurality of Tx lines;

an Rx driving circuit configured to receive voltages of the sensor nodes through the plurality of Rx lines, sample the received sensor node voltages, and convert the sampled sensor node voltages into touch raw data through analog-to-digital conversion; and a touch controller configured to receive and binarize the touch raw data by comparing each touch raw data with a threshold value, extract a touch area based on the binarized touch raw data, differently set a size of a computation block based on a position of the extracted touch area and the number of extracted touch areas, and perform a touch computation only on touch raw data of the computation block, wherein four boundaries of the computation block surround both multi-touch areas and a non-touch area at a shortest distance if the number of extracted touch areas is more than one.

6. The display device having touch sensors of claim 5, wherein when the number of extracted touch areas is plural, the touch controller sets the computation block consisting of four sides or four boundaries surrounding the plurality of touch areas at the shortest distance.

7. The display device having touch sensors of claim 6, wherein the size of the computation block is determined using outermost touch areas among the plurality of touch areas as vertexes.

8. A touch data processing method of a display device having touch sensors including a touch screen forming a plurality of sensor nodes at crossings of a plurality of Tx lines and a plurality of Rx lines, a display panel having the touch screen, a Tx driving circuit supplying a touch driving pulse to the plurality of Tx lines, and an Rx driving circuit which receives voltages of the sensor nodes through the plurality of Rx lines, samples the received sensor node voltages, and converts the sampled sensor node voltages into touch raw data through analog-to-digital conversion, the touch data processing method comprising:

receiving and binarizing the touch raw data by comparing each touch raw data with a threshold value and extracting a touch area based on the binarized touch raw data;

differently setting a size of a computation block based on a position of the extracted touch area and the number of extracted touch areas; and performing a touch computation only on touch raw data of the computation block, wherein four boundaries of the computation block surround both multi-touch areas and a non-touch area at a shortest distance if the number of extracted touch areas is more than one.

9. The touch data processing method of claim 8, wherein the differently setting of the size of the computation block includes, when the number of extracted touch areas is plural, setting the computation block consisting of four sides or four boundaries surrounding the plurality of touch areas at the shortest distance.

10. The touch data processing method of claim 9, wherein the size of the computation block is determined using outermost touch areas among the plurality of touch areas as vertexes.

* * * * *